United States Patent [19]

Osojnak

[11] Patent Number: 4,759,402
[45] Date of Patent: Jul. 26, 1988

[54] MODULAR CONSTRUCTION FOR RADIANT PANEL

[75] Inventor: Boris M. Osojnak, Bountiful, Utah

[73] Assignee: Aero Tech Manufacturing Inc., North Salt Lake, Utah

[21] Appl. No.: 85,702

[22] Filed: Aug. 17, 1987

[51] Int. Cl.⁴ .............................................. F24H 9/06
[52] U.S. Cl. ....................................... 165/56; 165/82; 165/171
[58] Field of Search ................... 126/92 R, 92 AC, 64, 126/92 A; 165/49, 82, 56, 76, 171

[56] References Cited

U.S. PATENT DOCUMENTS

| 3,263,747 | 8/1966 | McKay | 165/82 |
| 4,080,703 | 3/1978 | Beck, Jr. | 165/171 |
| 4,338,995 | 7/1982 | Shelley | 165/49 |

FOREIGN PATENT DOCUMENTS 2930675 2/1980 Fed. Rep. of Germany ........ 165/56

Primary Examiner—James C. Yeung
Attorney, Agent, or Firm—Robert R. Finch; Michael D. McCully

[57] ABSTRACT

Individual elongated radiant heat panel modules are secured together along their side edges to form a panel; and a plurality of transverse spaced-apart stiffeners are connected at a plurality of connection sites across the panel back to stiffen the panel and hold it fast. Each stiffener is fixedly connected to the panel at only one fixed connection site whereby to block relative movement between the stiffener and panel at said site; and each stiffener is additionally connected to the panel at a plurality of connection sites by spring clamps which hold the panel and modules thereof flat against the stiffener while permitting limited relative movement thereat between said stiffener and said panel. The connection sites on the stiffener are spaced therealong while the connections to the panels are at or adjacent the side edges of the individual modules. Adjacent individual modules are fixed to each other.

9 Claims, 2 Drawing Sheets

MODULAR CONSTRUCTION FOR RADIANT PANEL

BACKGROUND OF THE INVENTION

This invention relates to radiant metal panels fabricated by assembly of extruded modules, and in particular to ways and means for securing the assembly together while accommodating thermally-induced dimensional changes such as caused by temperature variation.

It is common to make panels by securing together several adjacent elongated modules. Tubes or pipes are secured to the back of the modules to conduct heat exchange medium therepast. Panels of this type are used in highly visible areas, such as meeting rooms, offices, and the like, where it is necessary that the face of the panel be and remain flat and neat appearing under all conditions. At the same time, for many reasons, the panel members should be of high heat conductivity and as light weight as possible.

In a usual construction, individual modules are of tongue and groove design, with a tongue along one side edge and a complemental groove along the other edge. Adjacent modules are fitted together, the grooves of one being crimped onto the tongue of another to hole them in assembled position. A plurality of spaced-apart rigid stiffeners are then secured transversely across the back of the panel and fixed individually to all the several modules to hold them securely as a flat rigid panel. The stiffener is also a straightener which contacts the modules in a straight line. Such construction, although widely used, does have some drawbacks. This is so because when all modules are fixed to the stiffener as in the prior construction, there is no relative movement possible between modules and stiffener, hence the panel cannot accommodate thermally-induced dimensional variations. When heat causes the modules to expand, the individual panel modules, being fixed to the stiffener, will buckle or fracture connections to the stiffener and/or cause the stiffener to bend. The stiffeners cannot be omitted because without them the panel will simply not lie flat.

SUMMARY OF INVENTION

It is the primary object of the present invention to provide a radiant heat panel that includes a plurality of side-by-side elongated modules and is adapted to accomodate thermally-induced transverse expansion and contraction of the individual modules.

Another object is the provision, in a panel of the type described, of a novel spring-clamp for connecting the modules to the stiffeners.

The foregoing and probably other objects of the invention are achieved in a panel of the type described by an arrangement whereby each stiffener is fixedly connected to the panel at only a single preselected site on the panel and stiffener thereby blocking relative movement between the parts at that site. Then, the stiffener is connected to the panel at additional sites, spaced along said stiffener across said panel, by clamps which permit limited relative movement between said stiffener and modules of the panel. In the preferred embodiment of the invention, the clamps are spring clamps which urge the stiffener toward and hold it against the panel modules.

In order that the invention may be more readily understood and carried into effect, reference is made to the accompanying drawings and descriptions thereof, which are offered by way of example only and not in limitation of the invention, the scope of which is defined by the appended claims, including equivalents embraced therein, rather than any description thereof.

DETAILED DESCRIPTION OF THE INVENTION

Figure 1:
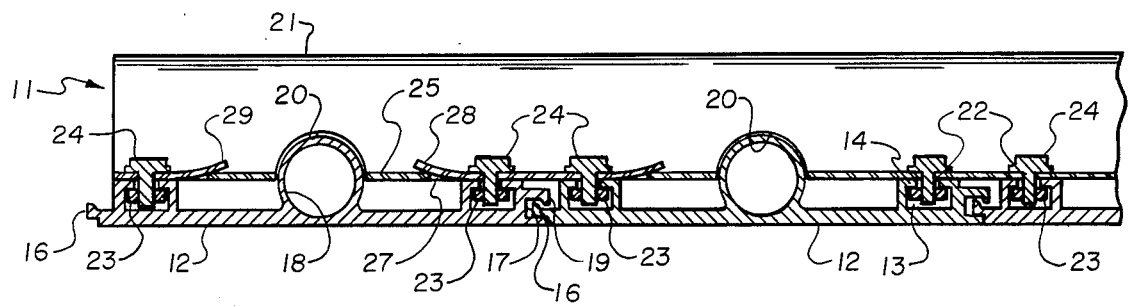
FIG. 1 is a sectional taken in the line of 1—1 of FIG. 3 looking in the direction of arrows 1 of FIG. 3. The section is taken adjacent one end of an assembled panel, some parts being shown in elevation.

With initial reference to FIG. 1, the assembled panel 11 is formed from adjoining individual modules 12, each of which is an extrusion of modest width, typically 5 to 9 inches. The modules have upwardly facing channels 13 along each edge. Each channel has two flanges 14 extending inwardly toward one another from the top edges of its sidewalls. A tongue 16 is formed along one side edge of the module and a complemental groove 17 is formed along its opposite edge. A hollow forms a conduit 18 on the module to accept a copper pipe, not shown.

For assembly, a plurality of modules are pressed together with tongues 16 received in respective grooves 17. A transverse stiffener 21 spans the panel across the backs of the modules. Cutouts 20 in the stiffener bottom and sides accept the conduits 18 so the stiffener 25 bottom will rest on the channel flanges 14 to maintain the panel flat.

In the preferred embodiment, two precisely located holes 22 in the flat bottom 25 of the stiffener near its center overlie and register with nuts 23 received in the channels 13 of adjacent modules 12. Screws 24 are directed through the holes 22 into the nuts and tightened snugly to rigidly fix the two central modules to the stiffener and thus to each other. This is the important fixed connection site at which no relative transverse motion can occur between the stiffener and panel or its modules.

The remaining connection sites on the stiffener are at the slots 27 and are sites where spring clamps are used to hold the stiffener to the panel yet allow relative movement. They may be referred to specifically as non-fixed connection sites or clamp sites.

A plurality of spring-clamps are provided. To this end, the rigid stiffener includes a plurality of slots 27 in the bottom located directly above and transverse to adjacent pairs of edge channels 13 of adjacent modules 12. A full spring clamp member 28 is aligned over the slot 27 and fastened to the modules by screws 24 tightened into the nuts 23 received in respective module channels 13. By this means the central section of the spring clamp 28 is fixed to the modules at the channel flanges 14. Thus, the same central spring section is a link fixing the modules to each other. The spring 28 is longer than the slot 27 so that its free ends extend past the ends of the slot and over the bottom of the stiffener. The spring 28 is also narrower than the slot 27 so rests on the flanges 14. The result is to establish a spring clamp operable to urge and hold the stiffener against the modules yet permit limited relative motion between the stiffener and the underlying modules. The screw holes through the spring clamp 28 are spaced apart the same distance as that between the holes 22 in the stiffener. This is the same spacing as between channels 13 of adjacent modules. The spring members 28, nuts 23, screws 24, and flanges 14 on the channel 13 combine to secure adjacent modules together in fixed relationship and to clamp the resulting panel against the stiffener 21.

In the illustrated embodiment, the basic non-fixed or slidable clamp connection is achieved by the spring clamp 28 urging the flat stiffener bottom 25 firmly against the channel flanges 14. In this arrangement, the spring may be considered as clamping the stiffener against the panel at the modules 12 even though the stiffener is never literally clamped between the spring and module. The lateral force, as produced by thermal expansion of a module, will result in relative movement between the stiffener and module. In this invention, when the modules expand, the increased width is accommodated by the spring clamp 28 yet the individual panel modules are maintained flat against the stiffener.

Figure 2:
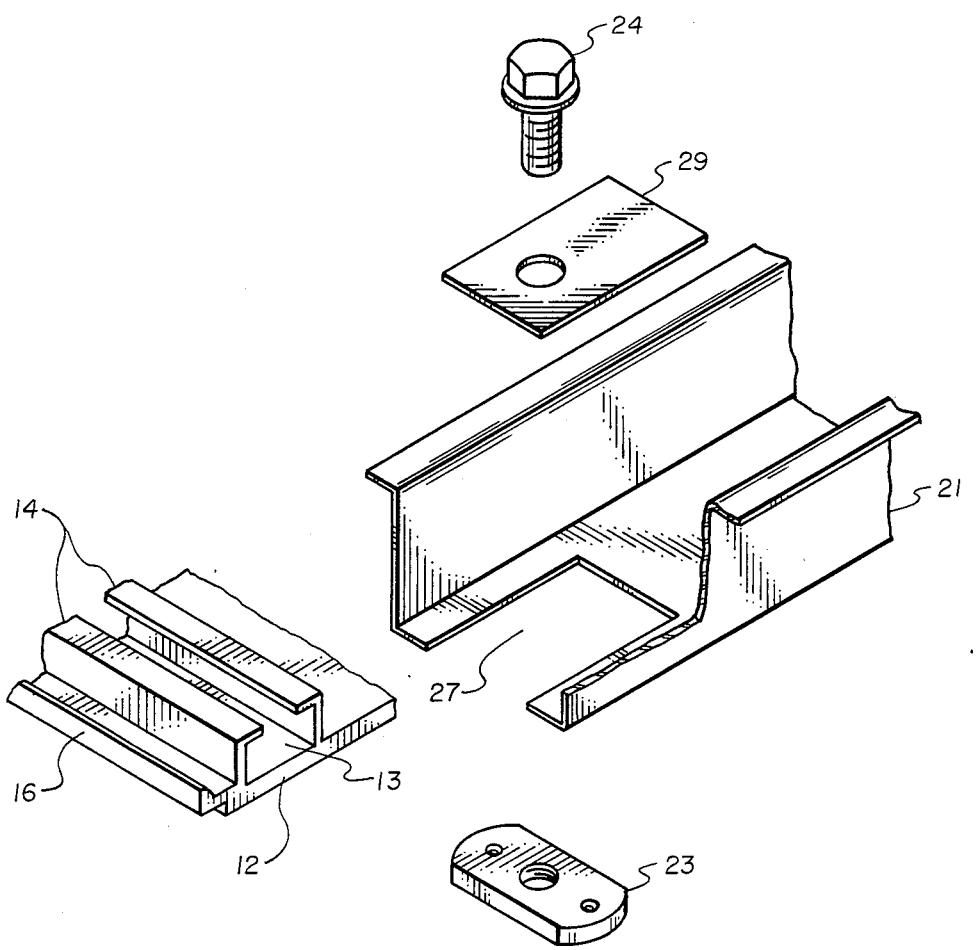
FIG. 2 is a partial perspective view of the left end of the assembly illustrated in FIG. 3, but in exploded or disassembled condition.
Figure 3:
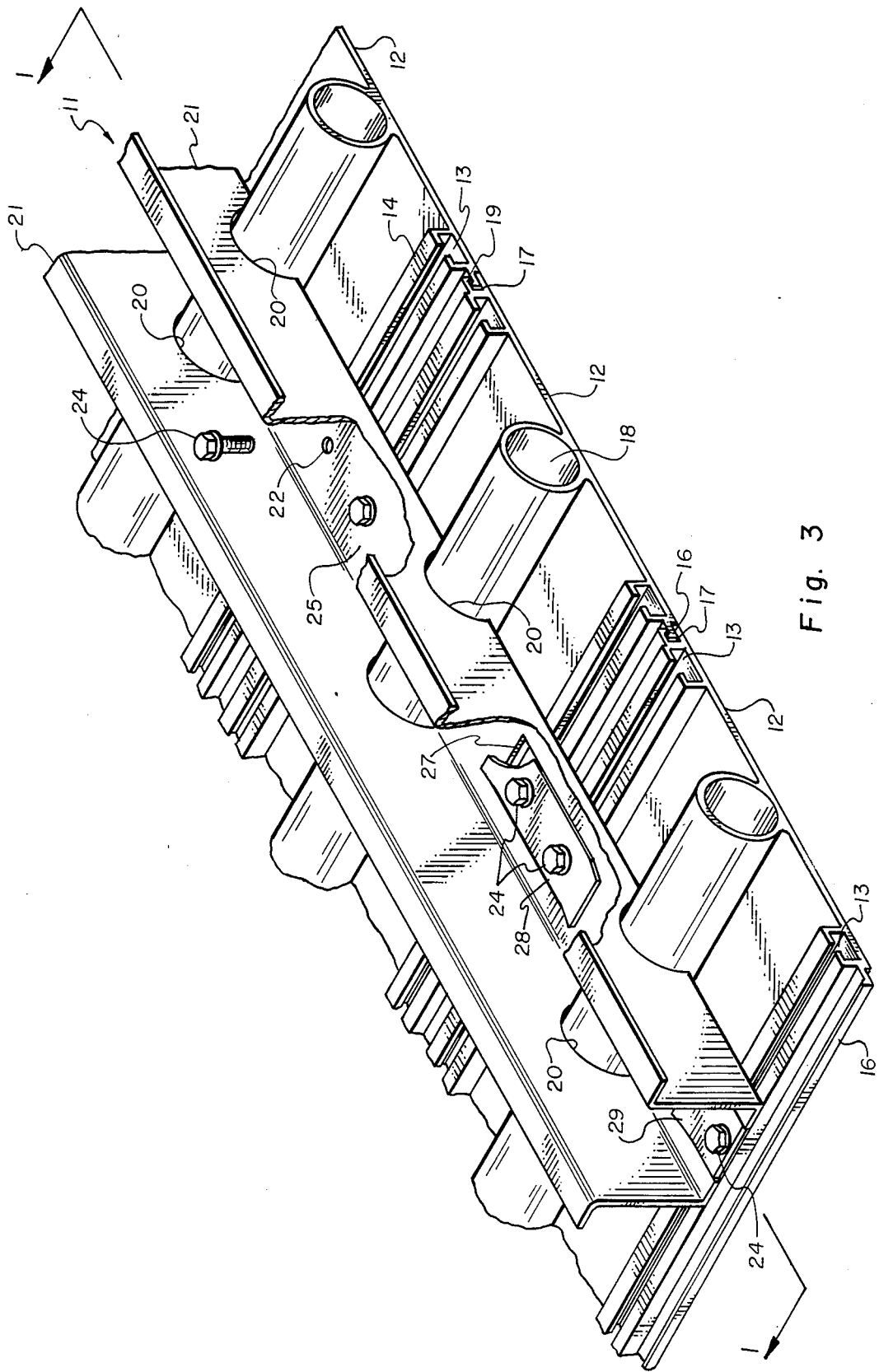
FIG. 3 is a partial perspective view of the panel illustrated in FIG. 1.

FIG. 2 illustrates a half size spring clamp member 29 used at the end of the stiffener adjacent an outer edge of the panel. A nut 23 is located in the outer channel 13 beneath an open ended slot 27 of the stiffener. The half size spring 29 is located above the stiffener to extend past the slot 27 and over the stiffener bottom. A screw 24 passes through the spring 29 and is screwed tightly into the nut 23 to urge the spring against the stiffener bottom.

The relative sliding movement between the individual panel modules and the stiffener is very slight, perhaps 1/32 to 1/16 of an inch for a full three foot panel of four nine inch wide modules. The spring clamp connections of the invention accommodate such movement.

It will be apparent to those skilled in the art that each panel assembly utilizes a plurality of transverse, parallel, spaced apart stiffeners and that, on any given panel, all stiffeners will be fixed to same modules by the same connection pattern.

As is usual, the exposed front side of the panel will be suitably finished. Copper tube will be fitted into the conduits 18, and the panels suitably connected and hung.

My invention is adapted for panel assemblies comprising a plurality of panel modules. Although the illustrated embodiment shows the sole fixed connection to be near the transverse center of the panel, said sole fixed connection may be at other locations such as the outer panel side edge or adjacent any joint between modules. The basic requirement is that there be only one fixed connection between each stiffener and panel and that the remaining connections be of non-fixed design, such as clamps, that permit relative movement as described.

Having thus described my invention, that which I desire to secure by Letters Patent is defined by the following claims.

I claim:

1. A radiant heat panel having a plurality of adjacent elongated modules joined together along their side edges and a plurality of transverse straight stiffeners across the back to stiffen the panel and hold said modules flat, characterized in that each stiffener is connected to said panel at a plurality of connection sites each of which is at or adjacent one of said side edges of said modules, and further characterized in that at only one of said connection sites there is provided a fixed connection comprising connection means securing said stiffener to said panel in a manner to block relative sliding movement thereat between said panel and said stiffener while at each of the other connection sites there is provided a non-fixed connection comprising a clamp holding said panel against said stiffener while being adapted to permit relative sliding movement between said stiffener and said panel at said connection site.

2. The invention according to claim 1 further characterized in that said fixed connection is at a site adjacent a joint between the side edges of adjacent modules near the transverse center of said panel.

3. The invention according to claim 1 characterized in that each of said connection sites is at or adjacent the side edge of one of said modules.

4. The invention according to claim 1 further characterized in that each of said stiffeners includes a bottom, a plurality of spaced-apart slots in said bottom each overlying a portion of the side edge of at least one of said modules, each of said clamps comprises a flat spring overlying one of said slots above said bottom of said stiffener and connected through said slot to at least one said module therebelow thereby to clamp said stiffener against said module.

5. The invention according to claim 4 further characterized in that at least some of said flat springs overlie the edges of two adjacent modules and are connected to both said modules thereby to fix said modules to each other.

6. The invention according to claim 1 further characterized in that said fixed connection is at a connection site adjacent the outer side edge of said panel.

7. The invention according to claim 1 characterized in that said connection means at said fixed connection comprises a screw extending through the bottom of said stiffener and screwed tightly into a threaded nut carried adjacent one edge of one of said modules of said panel.

8. The invention according to claim 7 characterized by the provision of channels on the back side of said modules extending along each side edge thereof and facing away therefrom, flanges extending inwardly from the walls of said channel and said threaded nut into which said screw extending through said stiffener is screwed is contained in said channel.

9. The invention according to claim 8 characterized in that adjacent modules are fixedly connected to each other by means of threaded nuts received in their respective channels, a rigid link with openings overlying said nuts, screws extending through said openings and screwed tightly into said nuts; and each said link at a non-fixed connection is part of said clamp thereat.

* * * * *